(12) United States Patent
Kothandam et al.

(10) Patent No.: US 9,916,315 B2
(45) Date of Patent: Mar. 13, 2018

(54) COMPUTER IMPLEMENTED SYSTEM AND METHOD FOR COMPARING AT LEAST TWO VISUAL PROGRAMMING LANGUAGE FILES

(71) Applicant: Tata Consultancy Services Ltd., Mumbai, Maharashtra (IN)

(72) Inventors: Jayanthi Kothandam, Chennai (IN); Geethalakshmi Rajendrababu, Chennai (IN); Samundeeswari Chinnaraju, Chennai (IN)

(73) Assignee: Tata Consultancy Services Ltd., Mumbai (IN)

( * ) Notice: Subject to any disclaimer, the term of this patent is extended or adjusted under 35 U.S.C. 154(b) by 388 days.

(21) Appl. No.: 14/740,858

(22) Filed: Jun. 16, 2015

(65) Prior Publication Data
US 2015/0370819 A1   Dec. 24, 2015

(30) Foreign Application Priority Data

Jun. 20, 2014   (IN) .......................... 2005/MUM/2014

(51) Int. Cl.
| | | |
|---|---|---|
| G06F 17/30 | (2006.01) | |
| G06F 17/22 | (2006.01) | |
| G06F 17/27 | (2006.01) | |
| G06F 3/0482 | (2013.01) | |
| G06F 21/31 | (2013.01) | |
| G06F 9/44 | (2018.01) | |

(52) U.S. Cl.
CPC ...... *G06F 17/30106* (2013.01); *G06F 3/0482* (2013.01); *G06F 17/2211* (2013.01); *G06F 17/2247* (2013.01); *G06F 17/272* (2013.01); *G06F 17/30126* (2013.01); *G06F 21/31* (2013.01); *G06F 8/71* (2013.01)

(58) Field of Classification Search
USPC .................................. 707/722, 758
See application file for complete search history.

(56) References Cited

U.S. PATENT DOCUMENTS

| | | | | |
|---|---|---|---|---|
| 6,236,993 B1 * | 5/2001 | Fanberg | .................... | G06F 8/71 707/690 |
| 6,282,698 B1 * | 8/2001 | Baker | ....................... | G06F 8/75 717/118 |
| 8,261,237 B2 * | 9/2012 | Zeidman | ................... | G06F 8/71 434/118 |

(Continued)

*Primary Examiner* — Cam-Linh Nguyen
(74) *Attorney, Agent, or Firm* — Blueshift IP, LLC; Robert Plotkin

(57) ABSTRACT

A computer implemented system for comparing at least two visual programming language files, the system comprising an intransient repository, a user interface, an authentication module, a menu driven selector module, an extractor module, a transient repository, a processor and a report generation module. A computer implemented method for comparing at least two visual programming language files, the method comprising the steps of verifying login credentials of a user, identifying a file type, identifying a file format, identifying file path to the files stored in an intransient repository, extracting files from the intransient repository, creating a copy each of the files in a transient repository, carrying out iterations of node-wise comparison between the files using a DOM parser and generating a report in a chosen file format.

9 Claims, 7 Drawing Sheets

(56) References Cited

U.S. PATENT DOCUMENTS

| | | | |
|---|---|---|---|
| 8,781,999 B2 * | 7/2014 | Janakiraman | G06F 17/30067 707/609 |
| 9,053,296 B2 * | 6/2015 | Mylroie | G06F 21/10 |
| 9,436,763 B1 * | 9/2016 | Gianos | G06F 17/30864 |
| 2003/0145278 A1 | 7/2003 | Nielsen | |
| 2004/0133544 A1 * | 7/2004 | Kiessig | G06F 17/30067 |
| 2004/0205509 A1 | 10/2004 | Lou | |
| 2005/0049924 A1 * | 3/2005 | DeBettencourt | H04L 43/028 705/21 |
| 2005/0114840 A1 * | 5/2005 | Zeidman | G06F 8/71 717/126 |
| 2005/0155027 A1 * | 7/2005 | Wei | G06F 8/44 717/162 |
| 2005/0268165 A1 | 12/2005 | Bells | |
| 2009/0089754 A1 * | 4/2009 | Zeidman | G06F 8/73 717/123 |
| 2011/0265063 A1 * | 10/2011 | de Oliveira Costa | G06F 8/75 717/120 |
| 2011/0320413 A1 * | 12/2011 | Roman | G06F 8/70 707/690 |
| 2012/0054595 A1 * | 3/2012 | Mylroie | G06F 17/2247 715/234 |
| 2012/0109905 A1 | 5/2012 | Tingstrom | |
| 2014/0165039 A1 * | 6/2014 | Asadullah | G06F 8/36 717/123 |

* cited by examiner

FIGURE 1 (Prior Art)

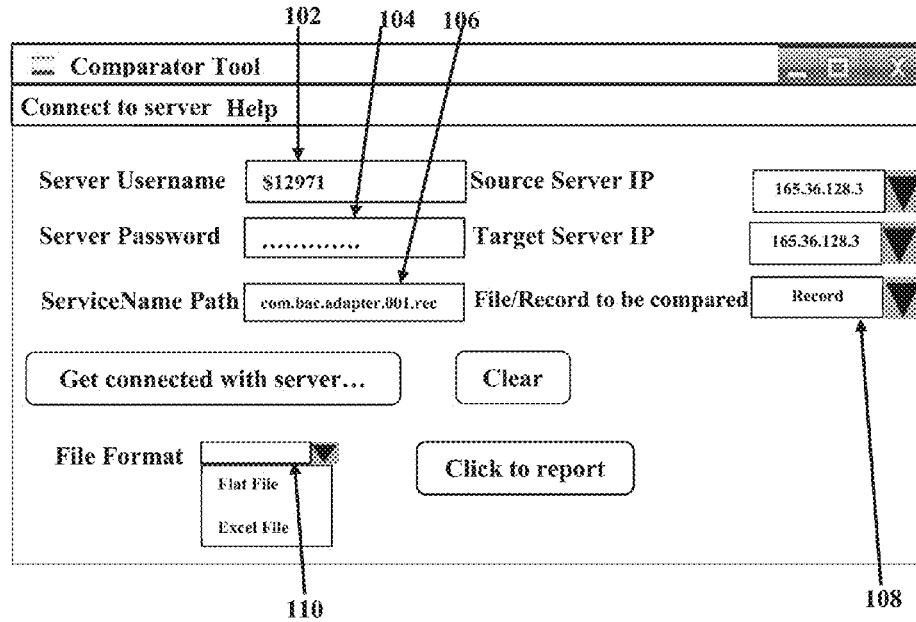

FIGURE 2c

```
****************************************************************
OUTPUT:
****************************************************************
    Service/Record Name: sample.test1:test1
    Base Environment    : localhost: 5401
    Target Environment  : localhost: 5555
    Total No. of Mismatches: 1
****************************************************************
1. ServiceName or Path: c:\Documents and Settings\582417\My Documents
\difference_final_report
Mismatch Step: FLOW{CLEANUP= true VERSION= 3.0}\SEQUENCE{EXIT-ON=SUCCESS
TIMEOUT=}\SEQUENCE{EXIT-ON=FAILURE TIMEOUT= }\ MAP {MODE=
STANDALONETIMEOUT= }\MAPDELETE{FIELD= /recordRef;1;0 NAME= Dropper}
Message: Missing 'MAPDELETE' In localhost: 5555
****************************************************************
```

FIGURE 3

COMPUTER IMPLEMENTED SYSTEM AND METHOD FOR COMPARING AT LEAST TWO VISUAL PROGRAMMING LANGUAGE FILES

FIELD OF THE DISCLOSURE

The present disclosure relates to the field of comparators.

Definitions

The expression 'Enterprise Application Integration (EAI)' used hereinafter in this specification refers to integration of applications through an organization that allows sharing of data throughout the networked applications.

The expression 'Comparator' refers to a tool used to compare two or more computer files.

In tree structures, the expression 'Node' is defined as a point where two or more lines meet. In accordance with the present specification, the expression 'Node' refers to a point in an information hierarchy representing a collection of data which share similar attributes. 'Flow' is a graphical programming language proprietary to webMethods, Software AG, Reston, Va., USA. In the context of the current disclosure a Flow file contains a program developed in webMethods.

'Record' is a file type, developed in webMethods.

The expression 'Keyboard-Interactive' used hereinafter in this specification refers to a user authentication protocol different from the traditional username-password based authentication protocol.

'Secure Shell 2 (SSH2)' is an encryption protocol.

'DOM parser' is a syntactic string analyzer for programs in an Extensible Markup Language (XML). In the context of the present disclosure, the 'DOM parser' is used in comparing nodes of programs in a graphical programming language.

The expression 'Flat file' used hereinafter in this specification refers to a type of file storage format.

The expression 'Microsoft Excel' used hereinafter in this specification refers to a spreadsheet file type proprietary to Microsoft Corporation, Redmond, Wash., USA.

BACKGROUND

With increased mobility of computing devices and collaborative editing of files, file comparators find an extensive use for editors and developers. Such comparators help identify changes made in a collaboratively edited file or identify differences between two files. Files may be compared word by word, but the complexity and time consumption increases with comparing large files and files including graphical objects.

Traditional methods used in parsing and comparing files in a visual programming language suffer drawbacks including limited application towards specific category of files, lacking a user interface and providing incoherent outputted results. Hence there is a requirement of a system for comparing files in a visual programming language which at least limits some of the above mentioned drawbacks while reducing time required for carrying out file comparisons.

OBJECTS

Some of the objects of the system of the present disclosure, which at least one embodiment herein satisfies, are as follows:

It is an object of the present disclosure to ameliorate one or more problems of the prior art or to at least provide a useful alternative.

An object of the present disclosure is to provide a computer implemented system and method for comparing at least two visual programming language files which saves time of the programmer.

A further object of the present disclosure is to provide a computer implemented system and method for comparing at least two visual programming language files which utilize the source code of Enterprise Application Integration (EAI) products.

Other objects and advantages of the present disclosure will be more apparent from the following description when read in conjunction with the accompanying figures, which are not intended to limit the scope of the present disclosure.

SUMMARY

In accordance with the present disclosure there is provided a computer implemented system for comparing at least two visual programming language files, the system including an intransient repository adapted to store the files, wherein each of the files is defined by a hierarchy of nodes, a user interface adapted to provide a platform for interaction between a user and the system, an authentication module adapted to authenticate login credentials of a user, a menu driven selector module configured to accept file type, file format and file path to the files to be compared, an extractor module adapted to extract the files from the intransient repository, a transient repository adapted to store a copy of the files extracted from the intransient repository, a processor adapted to perform a node by node comparison between the files stored in the transient repository using a comparator and a report generation module adapted to generate a result report based on results outputted by the comparator. Typically, the comparator is a DOM parser. Additionally, the file type is one of Flow and Record. Also, the file format is one of Flat file format and Microsoft Excel file format. Typically, the Flow file type contains at least one node from a group comprising sequence, invoke, branch, map, loop, repeat and exit. Additionally, the authentication type of the user login credentials is chosen from a group comprising authentication with a password and authentication with keyboard-interactive. Also, the intransient repository is a UNIX Server with SSH2 encryption. Typically, the file path is a combination of path to the intransient repository and one of flow.xml and node.ndf.

In accordance with the present disclosure there is further provided a computer implemented method for comparing at least two visual programming language files, the method including the steps of verifying login credentials of a user, identifying a file type chosen by the user as a first choice, identifying a file format chosen by the user as a second choice, identifying file path to the files stored in an intransient repository, extracting files from the intransient repository, creating a copy each of the files in a transient repository, carrying out iterations of node-wise comparison between the files using a DOM parser and generating a report in a chosen file format. Typically, the step of carrying out iterations of node-wise comparison between the files, wherein the file type of the files is of Record, the method further includes the steps of comparing field names and data types and comparing document references. Additionally, the step of carrying out iterations of node-wise comparison between the files, wherein the file type of the files is of Flow, the method further comprises steps verifying the flow steps and its attributes and comparing step values and drops.

BRIEF DESCRIPTION OF ACCOMPANYING DRAWINGS

A computer implemented system and method for comparing at least two visual programming language files of the present disclosure will now be described with the help of the accompanying drawings, in which:

FIG. 1 illustrates a screenshot of the result obtained using a conventional xml comparison system;

FIG. 2c illustrates a screenshot depicting the third step taken in using the user interface of the system in accordance with an embodiment of the present disclosure;

FIG. 3 illustrates a screenshot of the output of the system in accordance with an embodiment of the present disclosure;

DETAILED DESCRIPTION

A preferred embodiment of a computer implemented system and method for comparing at least two visual programming language files of the present disclosure will now be described in detail with reference to the accompanying drawings. The preferred embodiment does not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
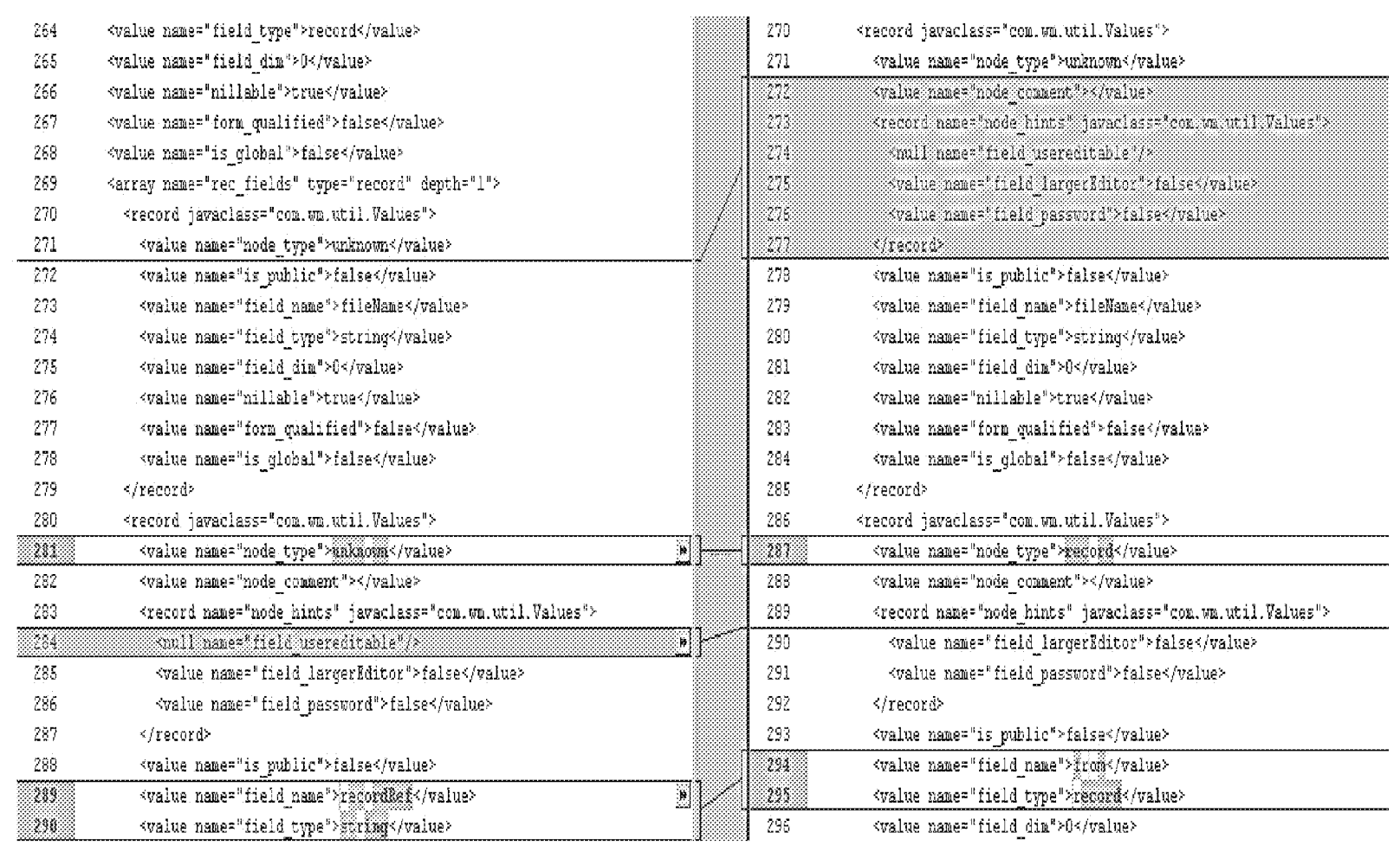

The disadvantages associated with the traditional methods used for comparing at least two visual programming language files include lack of user interface, incoherence of the outputted result, reliance on platform dependent development tools to develop comparators and lack of access to the source code files of the EAI products. FIG. 1 illustrates the screenshot of the outputted result obtained using a traditional xml comparison system. FIG. 1 illustrates a lack of a user interface thus making it hard for the programmer to interpret the results.

Figure 2A:
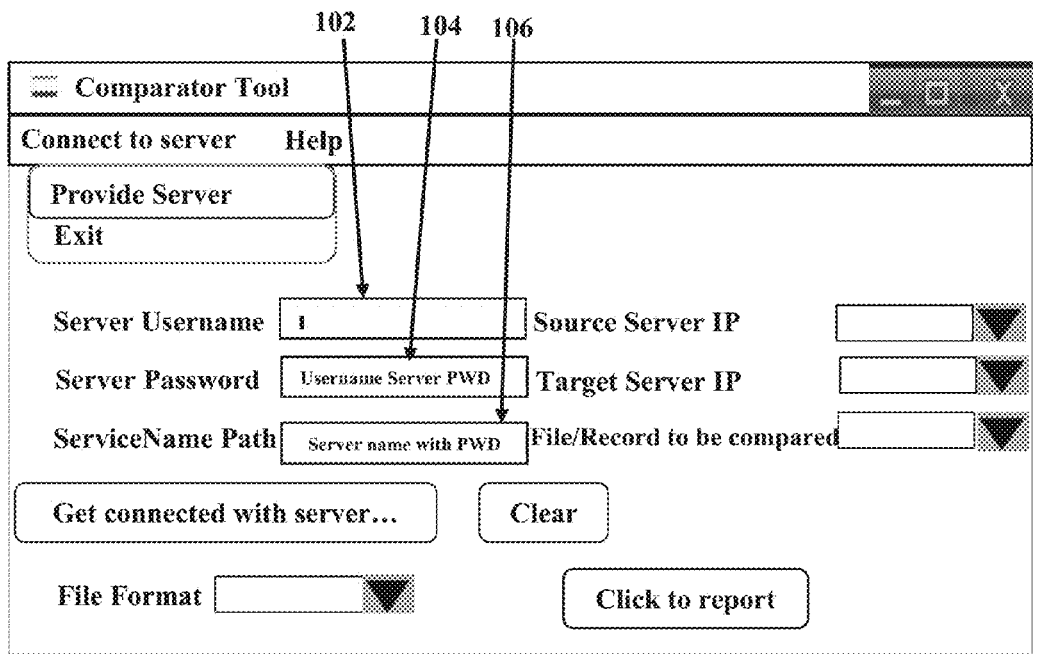
FIG. 2a illustrates a screenshot depicting the first step taken in using the user interface of the system in accordance with an embodiment of the present disclosure.

In order to overcome the difficulties and the disadvantages of the use of traditional methods, the present disclosure introduces a user interface based system. FIG. 2a illustrates a screenshot of the user interface where the user is requested to enter the credentials for logging into the system. The credentials include the Server Username 102 and Server Password 104. In accordance with one embodiment, a database of usernames and passwords is stored in one of a transient repository and an intransient repository. The authentication type of the user login credentials is chosen from a group containing authentication with a password and authentication with keyboard-interactive.

The system further includes a menu driven selector module which accepts as a response a file type of the files that would be compared, a file format in which the result from the comparison would be exported and a ServiceName Path 106 which would be used to access the files stored in an intransient repository. The menu driven selector module accepts as a response a first choice made by the user on the type of file to be compared. The user chooses between Flow and Record file types. Each of the file types is built of a hierarchy of nodes. The menu driven selector module accepts as a response a second choice made by the user on the file format in which the results are to be exported. The user chooses between a Flat file format and a Microsoft Excel file format. The ServiceName Path 106 includes the path built towards the location of the files stored in the intransient repository. In accordance with one embodiment, the file path is constructed as: File Path=Path to the Intransient Repository+Fully Qualified Name+flow.xml/node.ndf (depending on the file type).

The mentioned transient and intransient repositories are data storage devices. In accordance with one embodiment, the intransient storage device is a UNIX Server with SSH2 encryption. Yet further the system includes an extractor module. The extractor module extracts the files from the intransient repository and copies them to the transient repository. The menu driven selector module and the extractor module together constitute the file access module.

Figure 2B:
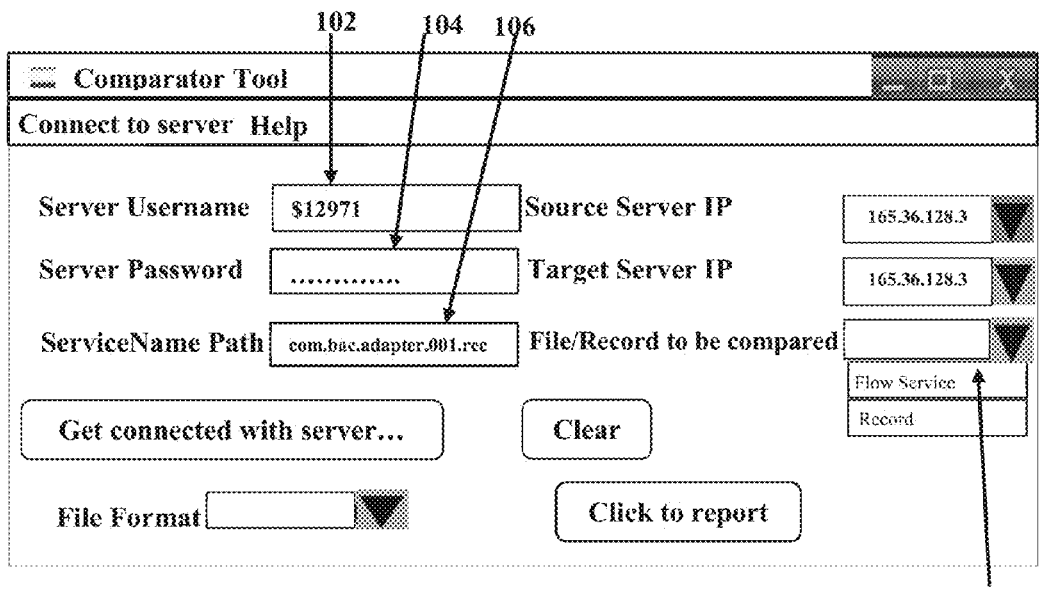
FIG. 2b illustrates a screenshot depicting the second step taken in using the user interface of the system in accordance with an embodiment of the present disclosure.

FIG. 2b illustrates a screenshot of the user interface allowing the user to choose the file type to be compared. A drop down button for choosing between Flow Service and Record is represented with the reference numeral 108.

FIG. 2c illustrates a screenshot of the user interface allowing the user to choose the format in which the results would be exported. A drop down button for choosing between Flat file format and Microsoft Excel file format is represented with the reference numeral 110.

FIG. 3 illustrates a sample output in accordance with an embodiment of the present disclosure. The figure illustrates a display of a sample message 'Missing 'MAPDELETE' in local host: 5555'. This allows the user to easily identify the difference between the files.

Figure 4A:
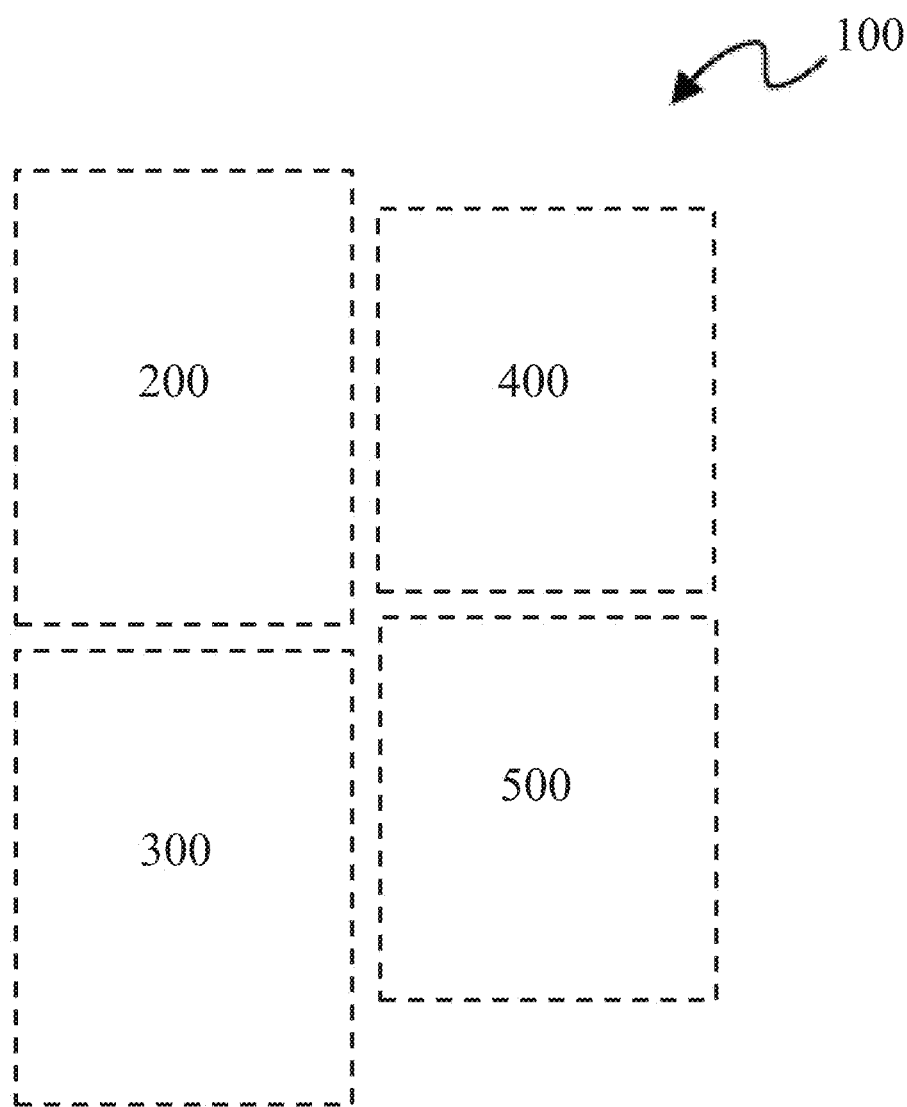
FIG. 4a illustrates the flowchart used in developing the system in accordance with an embodiment of the present disclosure.

FIG. 4a illustrates a flowchart used to develop the algorithm used by the system introduced in the present disclosure. The flowchart of the system is represented with the reference numeral 100.

Figure 4B:
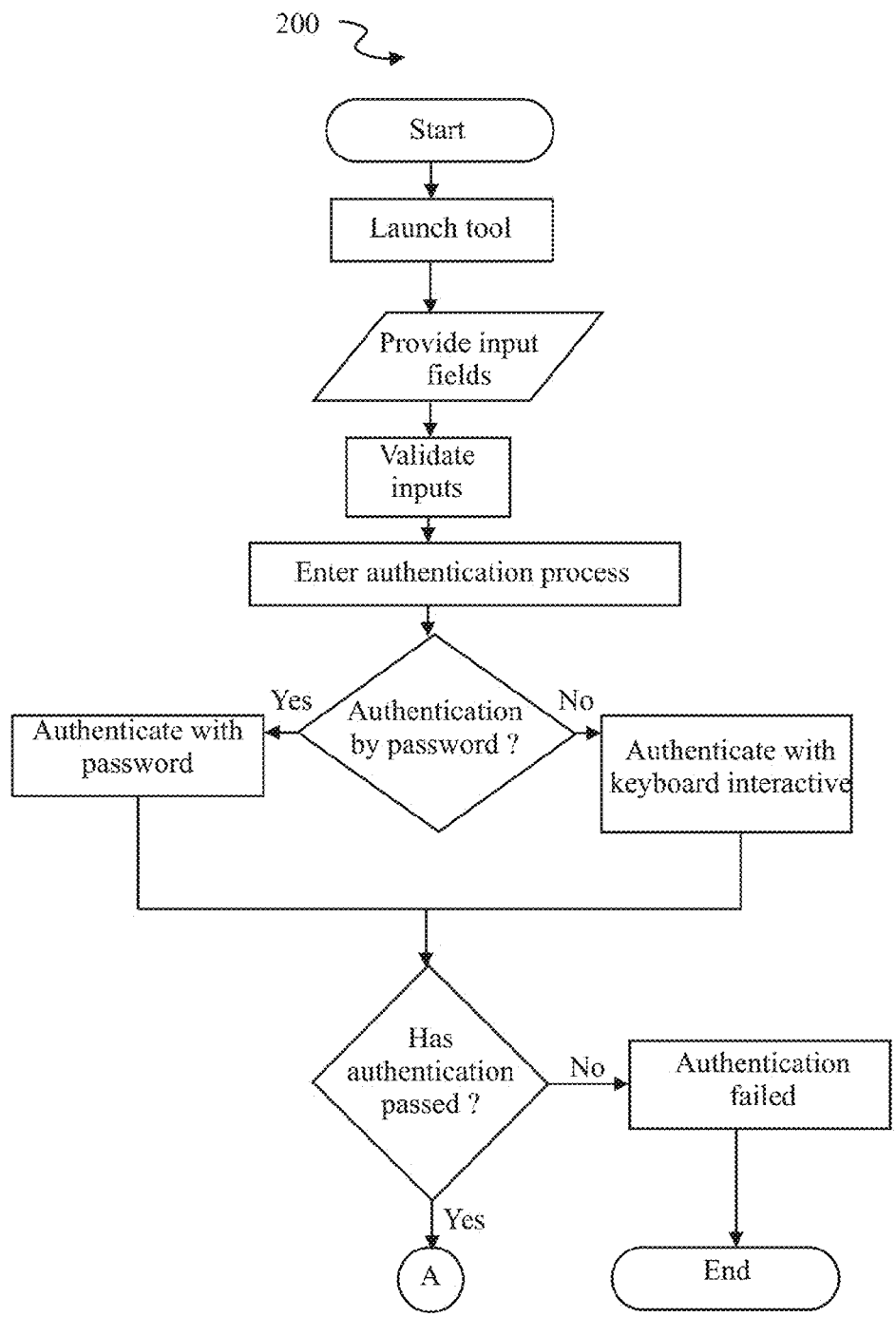
FIG. 4b illustrates the set of steps of the flowchart of FIG. 4a covered under an authentication module.

FIG. 4b illustrates the launching of the tool covered under the authentication module. The section of the flowchart 100 responsible for carrying out the steps covered under the authentication module is represented with the reference numeral 200. When launched, the system enters a state to authenticate login credentials. If the authentication fails, the system exits. If the authentication passes, the system performs the next section of steps illustrated in the flowchart 100.

Figure 4C:
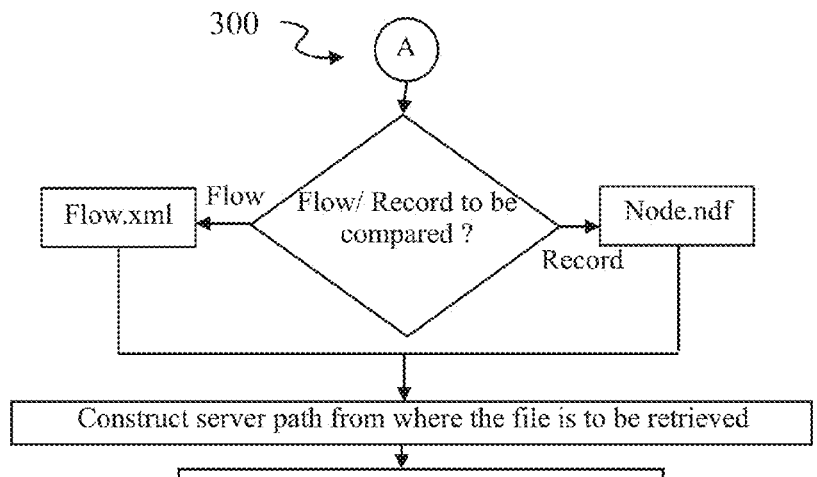
FIG. 4c illustrates the set of steps of the flowchart of FIG. 4a covered under a file access module.

FIG. 4c illustrates the section of the flowchart 100 covered under the file access module. The section of the flowchart 100 responsible for carrying out this step is represented with the reference numeral 300.

Figure 4D:
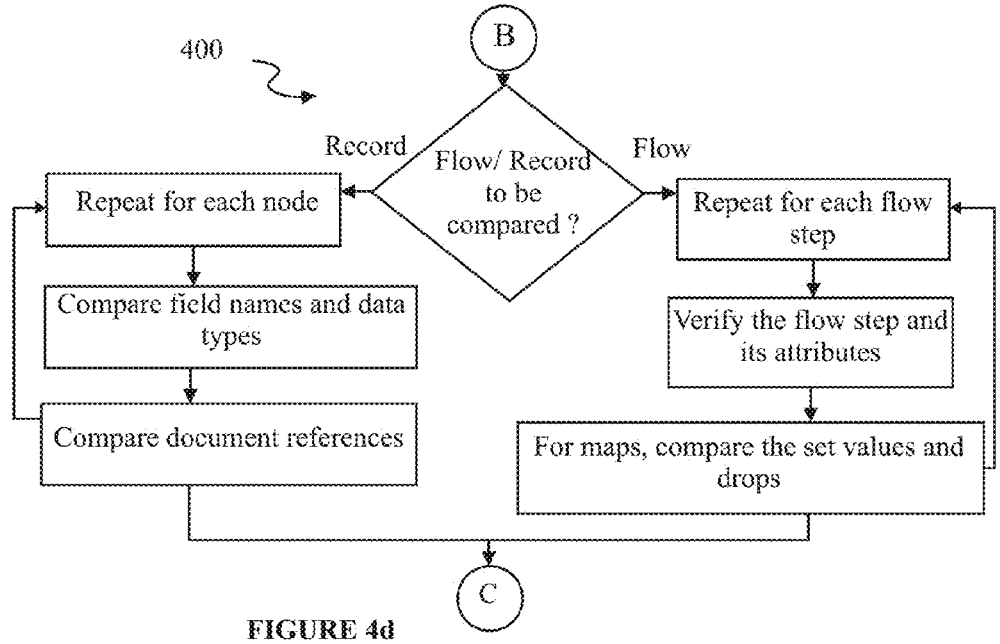
FIG. 4d illustrates the set of steps of the flowchart of FIG. 4a covered under a service comparison module.

FIG. 4d illustrates the section of the flowchart 100 covered under a service comparison module. The section of the flowchart 100 responsible for carrying out this step is represented with the reference numeral 400. The service comparison module includes the use of a processor, a comparator and the transient repository. On the basis of the selection made by the user between the Record file and the Flow file, the system dynamically accesses the files stored in the transient repository. The comparator performs a node by node comparison of the files while outputting the results. In accordance to one embodiment, the Flow file type contains nodes which include sequence, invoke, branch, map, loop, repeat and exit. In accordance with one embodiment, the comparator is a DOM parser. For the file type Record, the comparator compares field names, data types and document references. For the file type Flow, the comparator verifies the flow step and its attributes while comparing step values and drops.

Figure 4E:
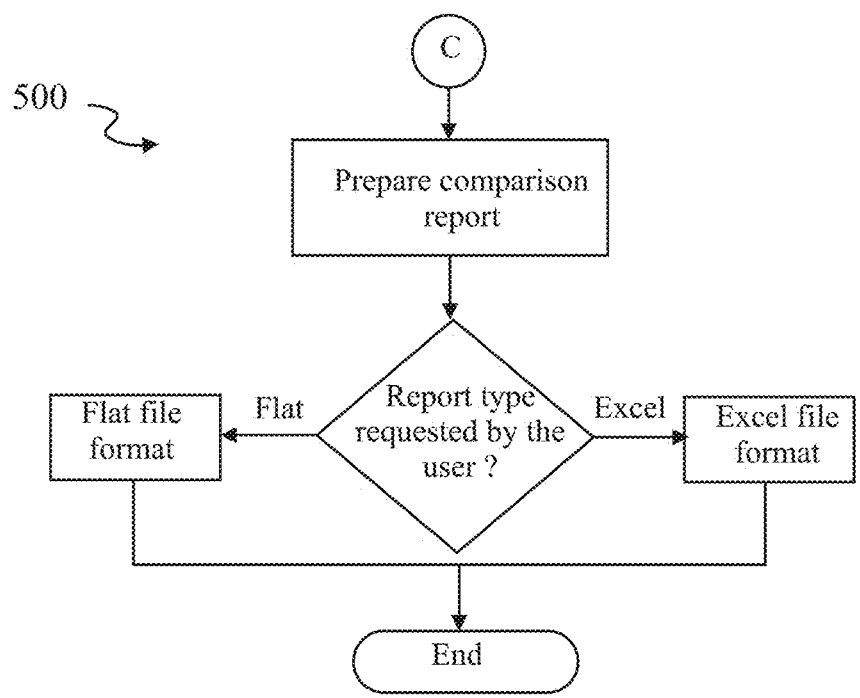
FIG. 4e illustrates the set of steps of the flowchart of FIG. 4a covered under a report generation module.

FIG. 4e illustrates the section of the flowchart 100 covered under the report generation module. This section of the flowchart 100 is represented with the reference numeral 500. The report generation module generates a result report based on the results outputted by the comparator. The result report is of the file format chosen by the user in the menu driven selector module and is stored in a default directory selected by the user.

Technical Advancements

The technical advancements offered by the present disclosure include the realization of:
 a computer implemented system and method for comparing at least two visual programming language files which saves time of the programmer while minimizing time required for comparison; and
 a computer implemented system and method for comparing at least two visual programming language files which accesses the source code of EAI products.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Wherever a range of values is specified, a value up to 10% below and above the lowest and highest numerical value respectively, of the specified range, is included in the scope of the disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

We claim:

1. A computer implemented system for comparing at least two visual programming language files, said system comprising:
   an intransient repository adapted to store said visual programming language files, wherein each of said visual programming language files is defined by a hierarchy of nodes, wherein said intransient repository is a server with SSH2 encryption;
   a user interface adapted to provide a platform for interaction between a user and said system;
   an authentication module adapted to authenticate login credentials of the user, wherein said login credentials is chosen from a group consisting of authentication with a password, and authentication with keyboard-interactive;
   a menu driven selector module configured to accept file type as a first choice, and file format as a second choice of said visual programming language files to be compared;
   an extractor module adapted to extract said visual programming language files from said intransient repository;
   a transient repository adapted to store a copy of said visual programming language files extracted from said intransient repository;
   a processor adapted to perform iterations of a node by node comparison between said visual programming language files stored in said transient repository using a comparator, wherein said comparator is a DOM parser; and
   a report generation module adapted to generate a result report based on results outputted by said comparator.

2. The system as claimed in claim 1, wherein said file type is one of Flow and Record.

3. The system as claimed in claim 2, wherein said Flow file type contains at least one node from a group comprising:
   sequence;
   invoke;
   branch;
   map;
   loop;
   repeat; and
   exit.

4. The system as claimed in claim 1, wherein said file format is one of Flat file format and Microsoft Excel file format.

5. The system as claimed in claim 1, wherein said server is a UNIX server.

6. The system as claimed in claim 1, wherein said file path is a combination of path to said intransient repository and one of flow.xml and node.ndf.

7. A computer implemented method for comparing at least two visual programming language files, said method comprising the following steps:
   verifying login credentials of a user;
   identifying a file type chosen by said user as a first choice;
   identifying a file format chosen by said user as a second choice;
   identifying file path to said visual programming language files stored in an intransient repository;
   extracting said visual programming language files from said intransient repository;
   creating a copy each of said visual programming language files in a transient repository;
   carrying out iterations of node-wise comparison between said visual programming language files using a DOM parser; and
   generating a report in the chosen file format.

8. The method as claimed in claim 7, wherein the step of carrying out iterations of node-wise comparison between said visual programming language files, wherein said file type of said visual programming language files is of Record, said method further comprises the following steps:
   comparing field names and data types; and
   comparing document references.

9. The method as claimed in claim 7, wherein the step of carrying out iterations of node-wise comparison between said visual programming language files, wherein said file type of said visual programming language files is of Flow, said method further comprises the following steps:
   verifying the flow steps and its attributes; and
   comparing step values and drops.

* * * * *